Aug. 11, 1942.    T. T. STACK ET AL    2,292,778
ADJUSTABLE CLOSURE
Filed March 20, 1941    2 Sheets-Sheet 1
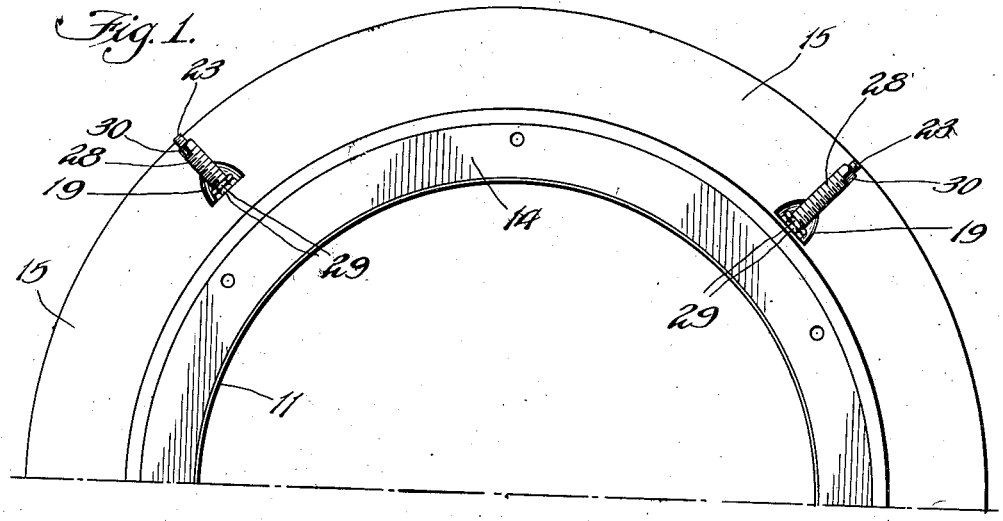
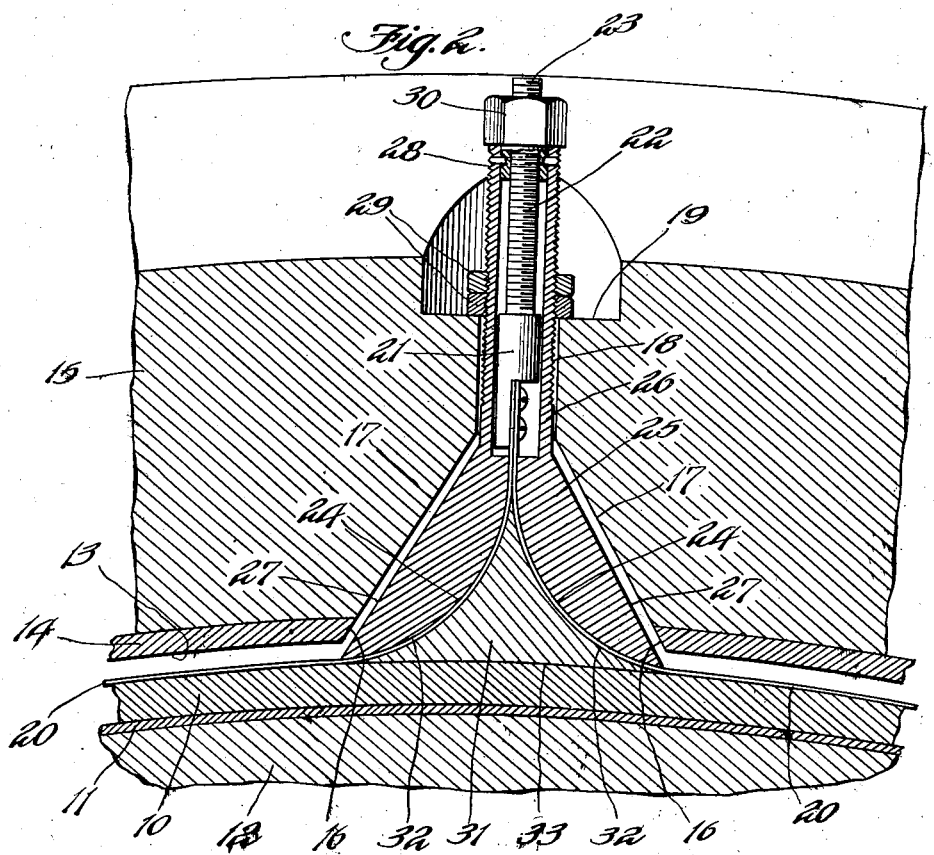
INVENTORS.
Theodore T. Stack
BY Frank E. Payne
Kent W. Worrell ATTORNEY.

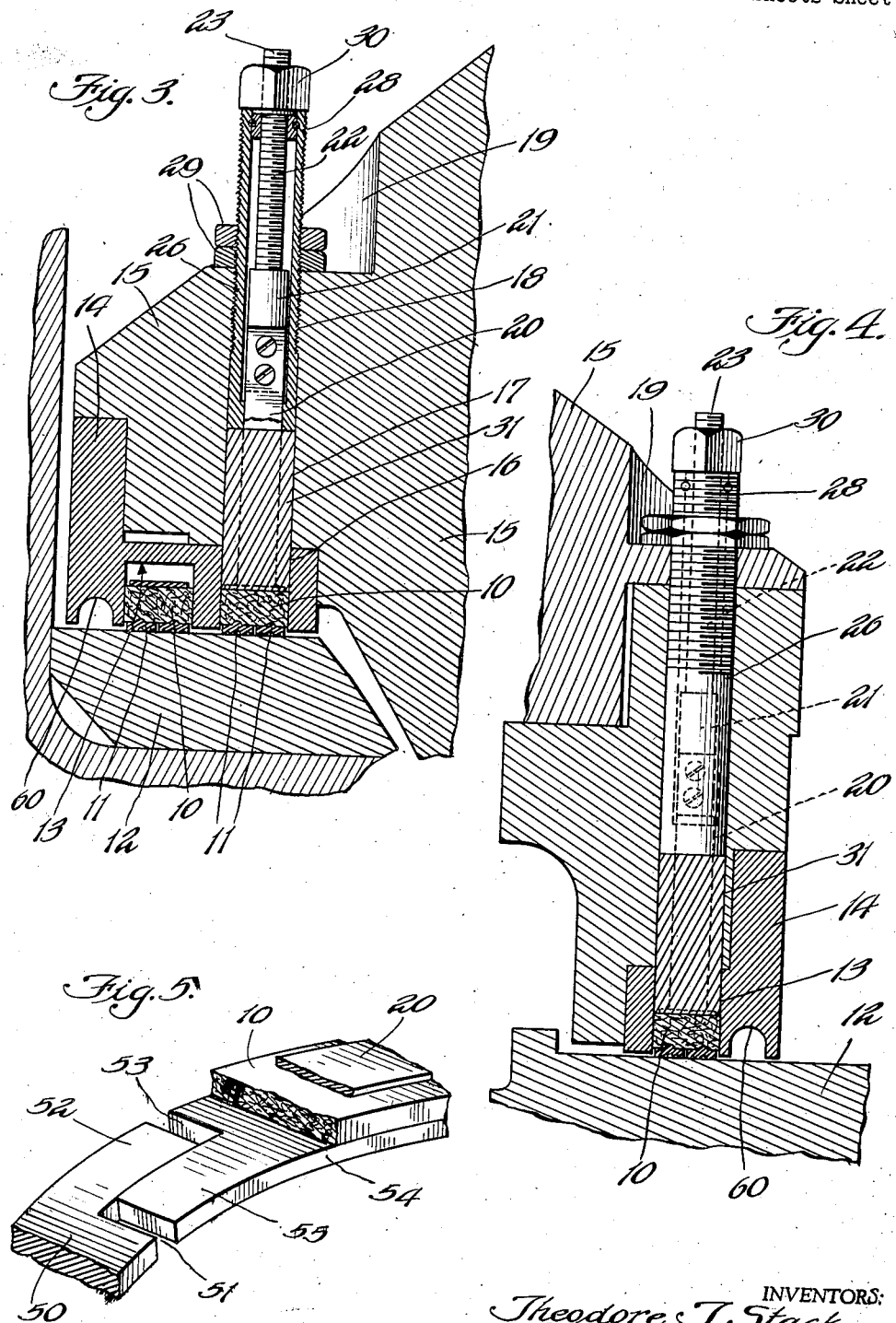

Patented Aug. 11, 1942

2,292,778

UNITED STATES PATENT OFFICE 2,292,778

ADJUSTABLE CLOSURE

Theodore T. Stack, Chicago, and Frank E. Payne, Barrington, Ill., assignors to Crane Packing Company, Chicago, Ill., a corporation of Illinois Application March 20, 1941, Serial No. 384,312

3 Claims. (Cl. 286—5)

This application relates in general to a sealing ring structure and is more particularly described as a ring clamping device for applying a seal to a rotating shaft or to a roll neck of relatively large diameter.

An important object of the invention is in the provision of a sealing ring structure with means for drawing up the ends of a sealing ring strap tightly about a sealing material which is seated in a sealing groove.

A further object of the invention is in the provision of a ring clamping device in which both ends of a sealing ring are engaged and drawn tightly at right angles to the sealing ring and at the same time preventing the ring from buckling or bending when it is tightened or loosened.

A further object of the invention is in the provision of a seal ring having a face of metal or other flexible anti-frictional material such as Bakelite, lignum vitae with a backing of compressible material which will expand outwardly under compression against the sides of a groove for maintaining a seal.

A still further object of the invention is in the provision of a sealing ring structure having a clamping ring connected at the ends for engaging a number of segmental sealing members which may be provided with overlapping joints to fill the space within the sealing slots and to take up the loose connection in the joints as the ring is tightened.

Other objects of the invention will be described in the specification and will be apparent from the accompanying drawings in which, Fig. 1 is a side elevation of a portion of an adjustable closure in accordance with this invention as applied to a shaft or roll neck of relatively large diameter;

Fig. 2 is a sectional view of one of the spring strip tighteners for applying a seal;

Fig. 3 is a transverse sectional view of a sealing ring tightener as shown in Figs. 1 and 2;

Fig. 4 is a sectional view similar to Fig. 3 of a single sealing ring tightener; and Fig. 5 is a detail sectional view showing the overlapping joint of a segmental sealing ring.

In the application of a seal to a large shaft or a roll neck, where the diameter to be sealed is as much as 36 or 40 inches, or even more, it is difficult to accurately fit and maintain a fluid seal and to apply sufficient pressure to the sealing member for accomplishing the desired result.

In the present invention, this difficulty is overcome by means of a clamping ring, the ends of which are mounted for drawing them outwardly at the same time for tightening the ring, and by providing a mounting block which forms a guide upon which the ends of the strip are supported at a tangent to the outer surface of the sealing material with an interior filling block fitting the space between the curved ends of the clamping ring so that when the ends are moved inwardly or outwardly, in loosening or tightening the seal, the seal will be held tightly in place below the curved ends of the clamping ring and these ends are prevented from bending or buckling due to the tightening or loosening movement thereof.

Referring now more particularly to the drawings, a packing or sealing material which may consist of fibrous compressible material 10 with an inner metallic contact ring or rings 11 of babbitt or other material, is shown mounted upon a shaft or roll neck 12 of relatively large diameter.

It is seated within a groove 13 of a gland ring 14 applied to and carried by a suitable support 15 surrounding the shaft or roll neck to which it is applied.

In order to tighten the sealing material or packing within the sealing groove and upon the shaft, the outer side of the gland is formed with a recess 16 which registers with an angular recess 17 in the support 15 from which a circular bore 18 extends to the outer side of the support or to a shouldered notch 19 therein.

To clamp the sealing material in the groove, an endless metal band 20 of spring steel or other suitable material of high tensile strength is placed at the bottom of the groove 13 in contact with the sealing material 10, and the ends of the strip are attached together and to a block 21 having a stem 22 with a threaded portion 23 at its outer end. The extremities of the clamping strip are positioned and guided by opposite inner curved surfaces 24 and a bearing block 25, the extremities of which may be positioned at the outer surface of the sealing material 10 substantially tangential to their points of contact therewith and curving upwardly and together at the center thereof where the block is formed with a tubular extension 26 which projects through the bore 18, the outer surface 27 of the block conforming to but not fitting tightly in the angular sides of the recess 17. The outside of the tubular extremity has a long threaded portion 28 engaged by lock nuts 29 which may be seated against the bottom of the notch 19, and the inside of the tubular extension receives the end block 21 for free movement therein, the threaded stem 23 projecting beyond the end of the tubular projection 26.

Threaded upon the outer portion of the stem is a nut 30 adapted to engage the outer end of the tubular extension 26 so that when it is drawn up tightly against the end of the stem, the extremities of clamping strip 20 are drawn up tightly therein.

The lock nuts 29 engaging with the outer threads of the tubular stem are adapted to position the guiding block with respect to the surface of the sealing material 10 and to move and position it in the angular slot 17, and the clamping nut 30 applies pressure to the ends of the clamping strip in any position in which the block is held.

When the clamping strip is loosened to relieve the sealing material as for repair or replacement, it might tend to buckle or bend in the space between the curved surfaces 24 if it were not for the presence of a block insert 31 having curved surfaces 32 conforming to the opposite guide surfaces 24 and a surface 33 of curvature corresponding to the surface of the sealing material 10 in contact with the outer end thereof. This insert block 31 may be attached to the guide block 25 or it may simply be held in place by its engagement with the ends of the strap 20 and its contact with the sealing material 10. The inner curvature 33 may be varied so that the same guide block 25 may be used for sealing installations for shafts of various sizes, as the curvature of the guide surface 24 may remain the same for a variation of diameters. This type of clamping ring structure may be applied to a gland with a single sealing groove 13 as shown in Fig. 4, or two or more parallel clamping ring structures may be applied to a gland with parallel grooves as shown in Fig. 3. In the latter case, the clamping ring structures for the different grooves are spaced apart as indicated in Fig. 1 so that the clamping rings and the seals will be overlapped with respect to each other and the clamping device will be separated for more ready access thereto.

With such installations in metallic grooves 13, the sealing material 10 is confined between the clamping strap 20 and between the metallic face strips 11 so that when pressure is applied by means of the clamping ring, the sealing material tends to expand outwardly to fit tightly against the walls of the groove, thus making a tight or sealing fit therewith. The application of the clamping strip thus provides a space in the bottom of the groove so that when pressure is relieved upon the ends of the strip, the resilience of the sealing material tends to take up or fill this clearance space and the sealing material is not injured or destroyed when reassembling or maintenance work is performed upon the seal.

A flexible strip of Bakelite or carbon accurately shaped or molded to fit the diameter of the shaft or roll neck may be an advantage in large diameter installations, particularly if broken up into five or six segments, or even more segments and assembled beneath the steel clamping strip. This would produce a floating type of packing and it might be necessary to provide an overlapping type of joint between the segments as illustrated in Fig. 5, each segment 50 having a recess 51 near one end forming a reduced extension 52 which conforms to an opposite recess 53 of the next section 54, producing an overlapping section 55. By accurately shaping and machining these parts, they may be tightly clamped by a clamping ring 20 as herein shown and described.

With the clamping ring structure as thus shown and described, it is possible to tighten or release the pressure of the seal and the clamping ring from the outside of the support without stopping or interfering with the operation of the moving parts. It is common to provide grooves or lanterns 60 at the edges of the glands to provide for oil and water releases and by observing the condition of these releases so far as the oil, water, or other fluid is concerned, the sealing rings may be adjusted accordingly.

We claim:

1. A sealing ring structure comprising a ring of sealing material, a clamping strip therefor having the ends curved outwardly and secured together, means for pulling the ends outwardly including a guide with curved inner edges for engaging the outer sides of the strip where the ends curve outwardly, and an inner substantially triangular filler block with inwardly curved faces to fit closely against the inner sides of the strip ends where they curve outwardly and against the outer curved face of the sealing material between the outwardly turned ends of the strip.

2. In a sealing ring structure, a holder for a circular seal having a recess extending outwardly therefrom, a clamping strip having curved ends extending together and outwardly in a recess, a guide in the recess with opposite inner curved surfaces engaging the outer curved sides of the strip near the ends and a hollow externally threaded tube extending outwardly from the recess, a threaded stem in the tube to which the ends of the strip are attached, an adjusting nut threaded on the stem and engaging the outer end of the tube tending to draw the guide inwardly in tightening the strip, and an adjusting nut threaded on the tube and engaging the holder at the outer end of the recess to limit the inner movement of the guide and to position the inner ends of the guide with the inner sides of the strip ends against the outer surface of a seal in the holder.

3. In a sealing ring structure, a ring of sealing material, a holder for the ring having a recess extending outwardly therefrom, a clamping strip having ends extending outwardy together in the recess, a guide in the recess with opposite curved surfaces at the inner end for engaging the outer sides of the strip near its ends and having a hollow externally threaded tube extending outwardly from the recess, means comprising a movable stem in the tube to which the ends of the strip are attached, means for drawing the stem outwardly with respect to the guide and tending to draw the guide inwardly, adjustable means on the tube for engaging the outer end of the recess for limiting the inward movement of the guide, and a filler block with three curved sides fitting in and filling the space at the inner end of the guide between the curved ends of the strip and the outer surface of the sealing material to prevent buckling of the material under pressure and of the ends of the strip when the outward pull thereon is released.

THEODORE T. STACK.
FRANK E. PAYNE.